United States Patent [19]

Eckert

[11] 3,961,644
[45] June 8, 1976

[54] FLAT SEAT VALVE, IN PARTICULAR, FOR THE CONTROL OF FUEL METERING DEVICES

[75] Inventor: Konrad Eckert, Stuttgart, Germany

[73] Assignee: Robert Bosch G.m.b.H., Stuttgart, Germany

[22] Filed: Sept. 12, 1973

[21] Appl. No.: 396,526

[30] Foreign Application Priority Data
Sept. 22, 1972 Germany............................ 2246477

[52] U.S. Cl....................... 137/625.65; 137/625.64; 137/625.5; 251/139
[51] Int. Cl.²......................................... F16K 31/06
[58] Field of Search................ 137/625.65, 625.64, 137/596.17, 625.5; 251/129, 139

[56] References Cited
UNITED STATES PATENTS

| | | | |
|---|---|---|---|
| 2,435,076 | 1/1948 | Hall | 137/596.17 |
| 3,001,549 | 9/1961 | Nelson et al. | 251/139 X |
| 3,420,494 | 1/1969 | Egner | 137/625.65 X |
| 3,426,800 | 2/1969 | Bauer | 137/625 |
| 3,521,854 | 7/1970 | Leiber et al. | 251/129 |

Primary Examiner—Arnold Rosenthal
Attorney, Agent, or Firm—Edwin E. Greigg

[57] ABSTRACT

A flat seat valve for the control of flowing media is described, which valve comprises a control membrane, clamped in fixedly in the valve housing as a movable valve member which is actuated by a solenoid and an armature; the membrane, which is mounted between two valve seats, serves as the movable member controlling the flow of the medium past the two valve seats and is so arranged that a change in one sense of the cross-sectional flow area at one of the valve seats leads to a change in the cross-sectional area of flow in the opposite sense at the other valve seat; the valve serves particularly for the control of the flow of liquids which serve as control media for fuel metering devices.

13 Claims, 1 Drawing Figure

U.S. Patent  June 8, 1976  3,961,644
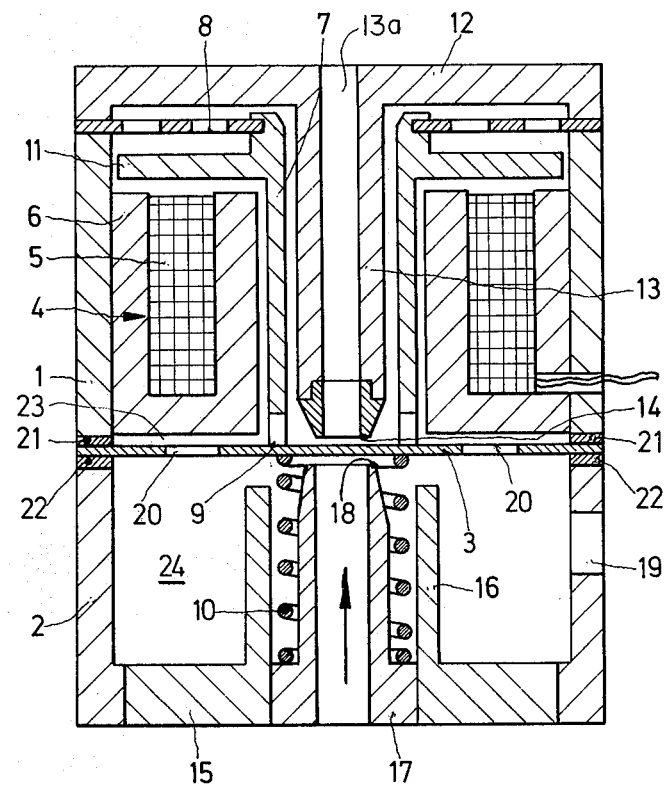

FLAT SEAT VALVE, IN PARTICULAR, FOR THE CONTROL OF FUEL METERING DEVICES

BACKGROUND OF THE INVENTION

The invention relates to a flat seat valve for the control of flowing media, which valve comprises a membrane clamped in fixedly in the valve housing, and a movable valve member actuated by a magnet cooperating with at least one stationary valve seat.

Particularly, in the case of fuel injection systems, it is required to intervene in an automatic control circuit by means which are inexpensive to manufacture, but operate accurately, in order to change the proportions prevailing in the circuit. In a fuel injection system, such change will be in the proportionality of the aspirated amount of air and the injected amount of fuel. This proportionality is changed in dependence on engine data, such as rpm, load, temperature and composition of the exhaust gases, in order to combust the fuel as completely as possible, thereby avoiding or strongly reducing the formation of toxic exhaust gases, while maintaining the greatest possible efficiency of the internal combustion engine and a minimum of fuel consumption. As in the case of many other control systems with similar requirements, it has been found in such automatic fuel injection control systems that liquid is a highly suitable control medium owing to its non-compressibility with preservation of its fluid properties.

Especially when using electrical means for measuring the amount of air or metering the amount of fuel, the solenoid valve is usually an important element of the control system, a magnetically controlled membrane valve being particularly preferred.

OBJECTS AND SUMMARY OF THE INVENTION

It is therefore an object of the invention to provide a novel valve of the afore-mentioned type, in which the above-described requirements are fulfilled better than in the known valves, which novel valve is, in particular, less expensive to manufacture, and which, as a most important advantage, permits keeping the control periods short, due to the fact that the pressures and the amounts of the in-flowing and out-flowing medium are controllable in dependence of one on the other.

This and other objects are attained according to the invention, by providing flat seat valve means of the type described which comprises, as a movable valve member, a membrane which is arranged between two valve seats and controls the passage through two valves in such a manner that a change in the cross-sectional area of flow through one of these valves results in a change in the opposite sense in the cross-sectional area of flow of the other valve, whereby the valve means serve, in particular, for the control of the flow of a liquid which serves as the control medium for a fuel metering device. In contrast to a known single-seat membrane valve, the valve means according to the invention permit adjustment of the pressure therein down to zero, whereby, in particular, it is possible to keep the control periods short. It is a drawback of known singleseat valves that, even at very low pressures, a certain amount of liquid must continually flow toward the liquid-consuming device in order to effect a pressure drop vis-a-vis the constantly inflowing amount of liquid; as a further drawback, the range of adjustment of such known valves is comparatively small.

The flat seat valve means according to the invention can be actuated either cyclically or proportionally.

According to an advantageous embodiment of the invention, the two valves are arranged at the ends of tubular sleeves serving for conveying the medium. The sleeves are arranged one in each housing element, which elements serve to clamp the membrane. A coil spring acting on the membrane and/or the armature of a magnet is arranged about the tubular sleeves. The frontal face of the housing turned towards the membrane extends in the same plane as the valve seat, whereby it can be lapped together with the valve seat in a single working step.

According to another embodiment of the invention, the valve seats are of different diameters, the medium having higher pressure being, advantageously, controlled by the valve of the larger seat diameter, whereby owing to the difference in the seat diameters, a controlling force acts in the closing direction towards the larger valve seat.

The invention will be better understood, and further objects and advantages will become apparent from the ensuing detailed specification of a preferred but merely exemplary embodiment taken in conjunction with the drawing.

BRIEF DESCRIPTION OF THE DRAWING

The drawing shows in axial section a preferred embodiment of the membrane valve according to the invention.

DETAILED DESCRIPTION OF THE EMBODIMENT

In a multiple-part housing of a membrane valve, a control membrane 3 is clamped between two sidewall elements 1 and 2 of the valve housing. In the interior of housing element 1, there is mounted an electromagnet 4 comprising a magnetic core 6 and a tubular armature 7. Armature 7 is axially displacably mounted on a guiding membrane 8 and contacts with its front end 9 the membrane 3. Depending on the intensity of the current applied to the exciting coil 5, armature 7 and, therefore, membrane 3 are displaced against the force of a resetting spring 10. Armature 7 bears near its rear end an annular flange 11 which extends radially between the rear end of magnetic core 6 and the guiding membrane 8 and serves to maintain a favorable magnetic flux.

Guiding membrane 8 is fixedly clamped-in between housing element 1 and the housing top element 12. A central sleeve 13 depends from the top element 12 being integral therewith in the embodiment shown in the drawing; this sleeve 13 extends into the interior of the valve housing, and normally serves for conveying low pressure return fluid out of the valve housing through the duct 13a in sleeve 13. At the inner end of sleeve 13 a valve seat 14 is provided which obturates the flow of fluid through the valve when membrane 3 is caused to be moved by solenoid 5 to rest sealingly against valve seat 14. This valve seat is manufactured from a non-magnetizable material (for example, Duratherm). Housing top element 12 and sleeve 13 are also manufactured from a non-magnetic, but softer material, for example, from Duralumin, in order to avoid a magnetic flux via valve seat 14 and membrane 3 which could cause an adhesion of the membrane at the seat.

In the botton end of sidewall element 2 there is inserted a bottom insert 15 which is integral with an inwardly projecting sleeve 16; in the interior of the latter there is seated a sleeve element 17 which, on the one hand, serves as an abutment for return spring 10, and, on the other hand, as a second valve seat 18, i.e., a second obturating means, for which the membrane 3 serves as the movable valve member. The diameter of valve seat 18 is larger than that of valve seat 14, and usually serves as a fluid inlet through sleeve element 17. The chambers 23 and 24 enclosed by the valve housing are in constant free communication with each other by way of apertures 20 in the membrane 3, so that the same pressure prevails in the entire housing. Owing to the difference in the valve seat diameters a force acts on membrane 3 in the direction toward valve seat 18 in opposition to the bias of spring 10, which force is a function of the difference of the annular cross-sectional areas for the passage of fluid between membrane 3 and seat 14, on the one hand, and between membrane 3 and valve seat 18, on the other hand, as well as of the fluid pressure prevailing in the housing. Due to the action of this force, the membrane valve is given a self-regulating character, i.e., an increase of pressure in the housing causes a throttling of the inflow of fluid, and a wider opening of the out-flow gap between membrane 3 and valve seat 14, until a corresponding pressure decrease has been effected in the housing.

Instead of making the diameters of valve seats 14 and 18 different, the membrane valve can be equipped with valve seats having the same diameters and can still serve for different control purposes. If, for example, the regulating medium is guided under pressure through sleeve 13, sleeve 17 is pressure-relieved, and outlet 19 in housing sidewall element 2 can be connected to a fluid-consuming device; then, the consuming pressure will increase together with a rising current applied at the exciting coil 5; the membrane valve thus serves as a proportional action controller (P-controller).

If, on the other hand, sleeve 17 serves as a pressure connection, and sleeve 13 is pressure-relieved, then the valve acts as a negative proportional action controller (NP-controller). Generally, however, a valve having valve seats of the same diameters will be operated in cycles.

The peripheral frontal face of housing element 1 facing membrane 3 extends in the same plane as valve seat 14 and the peripheral frontal face of housing element 2 extends in the same plane as valve seat 18. The distance of membrane 3 from valve seat 14 and 18, respectively, is ensured by spacing rings 21 and 22 which are arranged between the frontal faces of housing elements 1 and 2, respectively, and membrane 3. Due to this arrangement it is possible, after the respective housing elements constituting halves of the housing (and which, on the one hand, consist of elements 1 and 12, and, on the other hand, of elements 2, 15 and 17) have been assembled, to finish the valve seats and the frontal faces to be contacted by rings 21 and 22 in a single working step. As a result, after installation of the membrane 3, i.e. after the assembly of the two halves of the valve housing, no additional tensions will act on the membrane as a completely flat clamping-in of the latter will be assured. Thereby, it also becomes possible to achieve a very precisely defined stroke between the membrane and the valve seats, of, for example, as little as 0.2 millimeters. Experiments have shown that a surface width of the annular face of the valve seat which is smaller than 0.2 millimeters affords a particularly effective sealing. Greater widths of these annular valve seat faces may result in a sudden increase in the force and the pressure of the fluid at lifting of the membrane off the valve seat.

The faces of the armature flange 11 and the magnetic core 6 opposite one another can be beveled conically, whereby the width of the gap between them changes a lesser distance than is covered by a stroke of the armature.

What is claimed is:

1. A flat seat valve for the control of the flow of a fluid medium, comprising
    a valve housing;
    a control membrane clamped-in fixedly across the interior of said housing such that the membrane lies in a plane which extends substantially transversely with respect to the housing and divides the interior of said housing into two spaces, said membrane having at least one aperture establishing free communication between the two spaces;
    a solenoid adapted for axially displacing said membrane when energized, said solenoid comprising an exciting winding, a magnetic core and an armature arranged about one of said sleeves, said armature comprises an external annular flange extending radially past said exciting coil and magnetic core in the interior of said housing;
    first valve seat-bearing means stationary in said housing on one side of said membrane; and
    second valve seat-bearing means stationary in said housing on the opposite side of said membrane each said valve seat-bearing means comprises a tubular sleeve which projects from an interior wall of said housing toward said membrane therein and includes a valve seat at its end adjacent said membrane, said valve seats being of different diameter and defining along with their respective tubular sleeves a flowpath for said fluid medium;
    Whereby displacement of the membrane produces a change in the distance of said membrane from one of said valve seats and hence in the width of the one flowpath past said valve seat and a change in the opposite sense in the distance of the membrane from, and hence the width of the other flowpath past, said other valve seat.

2. A valve as described in claim 1, wherein the plane in which said membrane is clamped-in in said housing coincides with the plane in which one of said valve seats is situated.

3. A valve as described in claim 2, wherein at least one of said valve seats has an annular seat area being less than 0.2 millimeters wide.

4. A valve as described in claim 1, wherein at least one of said tubular sleeves is integral with said housing.

5. A valve seat as described in claim 1, wherein said housing has a bore in the housing wall away from said sleeves and serving as an additional flowpath for said medium, whereby said valve is adapted for serving as a 3/2-way valve.

6. A valve as described in claim 1, further comprising spring means adapted for biasing said membrane, said spring means being mounted about one of said sleeves.

7. A valve as described in claim 1, further comprising a guiding membrane in said housing, from which said armature is suspended for frictionless displacement in the direction of the central axis of said control membrane.

8. A valve as described in claim 1, wherein said armature is adapted for having its stroke correspond to the intensity of a current applied to said exciting winding.

9. A valve as described in claim 1, wherein at least those portions of said sleeves bearing said valve seats are made of non-magnetizable material, thereby interrupting magnetic flux therethrough.

10. A valve as described in claim 1, wherein when the interior of said valve housing is subjected to a pressure increase, a force is produced in said medium due to the difference in the diameters of the valve seats which acts on said membrane in the direction of obturating said valve seat of larger diameter.

11. A valve as described in claim 1, wherein said housing comprises a plurality of wall elements, said control membrane being clamped-in between two of said elements constituting together the side wall of said housing.

12. A valve as described in claim 11, wherein the side wall elements each includes a membrane-contacting face, and wherein the plane wherein the membrane-contacting face of one of said sidewall elements extends is the plane in which the valve seat on the same side of said membrane is located, whereby said membrane-contacting face and said valve seat can be finished together.

13. A valve as described in claim 11, wherein said housing comprises shim means interposable between said membrane and the clamping face of the adjacent one of said sidewall-constituting elements of said housing, thereby serving to adjust the distance between the plane in which said clamping face extends and the plane in which the valve seat on the same side of said membrane is situated.

* * * * *